(12) United States Patent
Saito et al.

(10) Patent No.: US 10,324,470 B2
(45) Date of Patent: Jun. 18, 2019

(54) VEHICLE CONTROL DEVICE AND VEHICLE

(71) Applicant: SUBARU CORPORATION, Tokyo (JP)

(72) Inventors: Hirotaka Saito, Tokyo (JP); Junya Seki, Tokyo (JP); Kazufumi Suzuki, Tokyo (JP); Yuki Osada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 113 days.

(21) Appl. No.: 15/459,206

(22) Filed: Mar. 15, 2017

(65) Prior Publication Data
US 2017/0285647 A1 Oct. 5, 2017

(30) Foreign Application Priority Data
Mar. 31, 2016 (JP) .................................. 2016-071117

(51) Int. Cl.
*G05D 1/02* (2006.01)
*B60W 10/08* (2006.01)
(Continued)

(52) U.S. Cl.
CPC ........... *G05D 1/0219* (2013.01); *B60Q 1/525* (2013.01); *B60Q 5/006* (2013.01); *B60W 10/08* (2013.01);
(Continued)

(58) Field of Classification Search
CPC .. G05D 1/0212; G05D 1/0219; G05D 1/0088; G05D 1/16; G05D 1/161;
(Continued)

(56) References Cited

U.S. PATENT DOCUMENTS 8,346,426 B1 * 1/2013 Szybalski ............. B60W 50/14
701/28
8,606,512 B1 * 12/2013 Bogovich ............. G06Q 40/08
701/423
(Continued)

FOREIGN PATENT DOCUMENTS

JP    2007-163274 A    6/2007
JP       4049069 B2    2/2008
(Continued)

OTHER PUBLICATIONS

Office Action issued in corresponding Japanese Patent Application No. 2016-071117, dated Sep. 19, 2017 (with English Machine Translation).
(Continued)

*Primary Examiner* — Thomas G Black
*Assistant Examiner* — Sara J Lewandroski
(74) *Attorney, Agent, or Firm* — McDermott Will & Emery LLP

(57) ABSTRACT

Provided is a vehicle control device mounted on a vehicle including an environment recognition unit and an automatic operation control unit. The environment recognition unit is configured to acquire information on surrounding environment around the vehicle, and provide the automatic operation control unit with the information on the surrounding environment. The automatic operation control unit is configured to acquire select one proposed traveling line, as a target traveling line of the vehicle, from a plurality of proposed traveling lines, on a basis of the information on the surrounding environment, and allow the vehicle to travel along the target traveling line. The vehicle control device is configured to acquire provide display of an image of one or more non-selected traveling lines other than the proposed traveling line selected as the target traveling line from the
(Continued)

plurality of proposed traveling lines, together with display of an image of the target traveling line.

4 Claims, 4 Drawing Sheets

(51) Int. Cl.
| | |
|---|---|
| B60W 10/20 | (2006.01) |
| G08G 1/16 | (2006.01) |
| B60W 30/095 | (2012.01) |
| B60W 30/10 | (2006.01) |
| B60W 50/14 | (2012.01) |
| G05D 1/00 | (2006.01) |
| B60W 30/09 | (2012.01) |
| G01C 21/34 | (2006.01) |
| G01C 21/36 | (2006.01) |
| B60Q 1/52 | (2006.01) |
| B60Q 5/00 | (2006.01) |
| G06K 9/00 | (2006.01) |

(52) U.S. Cl.
CPC ............ *B60W 10/20* (2013.01); *B60W 30/09* (2013.01); *B60W 30/0956* (2013.01); *B60W 30/10* (2013.01); *B60W 50/14* (2013.01); *G01C 21/3461* (2013.01); *G01C 21/3492* (2013.01); *G01C 21/3667* (2013.01); *G01C 21/3694* (2013.01); *G05D 1/0088* (2013.01); *G06K 9/00791* (2013.01); *G08G 1/16* (2013.01); *G08G 1/166* (2013.01); *G08G 1/167* (2013.01); *B60W 2050/146* (2013.01); *B60W 2420/42* (2013.01); *B60W 2420/52* (2013.01); *B60W 2420/62* (2013.01); *B60W 2520/06* (2013.01); *B60W 2550/10* (2013.01); *B60W 2550/14* (2013.01); *B60W 2600/00* (2013.01); *G05D 2201/0213* (2013.01)

(58) Field of Classification Search
CPC ........ G05D 1/162; G05D 1/163; G05D 1/164; G05D 1/165; G05D 1/166; G05D 1/167; G05D 1/168; G05D 2201/0213; B60W 30/06; B60W 30/09; B60W 30/095; B60W 30/0956; B60W 30/10; B60W 30/12; B60W 30/16; B60W 2050/146; G02B 27/01; G01C 21/00; G01C 21/005; G01C 21/20; G01C 21/26; G01C 21/28; G01C 21/30; G01C 21/32; G01C 21/34; G01C 21/3407; G01C 21/3415; G01C 21/343; G01C 21/3446; G01C 21/3453; G01C 21/3461; G01C 21/3469; G01C 21/3476; G01C 21/3484; G01C 21/3492; G01C 21/36; G01C 21/3602; G01C 21/3626; G01C 21/3635; G01C 21/3638; G01C 21/3644; G01C 21/3647; G01C 21/365; G01C 21/3658; G01C 21/3661; G01C 21/3667; G01C 21/367; G01C 21/3673; G01C 21/3676; G01C 21/3691; G01C 21/3694; G01C 21/3697
See application file for complete search history.

(56) References Cited

U.S. PATENT DOCUMENTS

| | | | | |
|---|---|---|---|---|
| 8,676,431 B1* | 3/2014 | Mariet | ...................... | B60T 7/22 701/28 |
| 9,188,985 B1* | 11/2015 | Hobbs | .................... | G01C 21/34 |
| 9,222,795 B1* | 12/2015 | Gerlach | ............ | G01C 21/3667 |
| 9,975,559 B2* | 5/2018 | Alaniz | ..................... | A63F 13/00 |
| 2007/0005233 A1* | 1/2007 | Pinkus | ................. | G01C 21/362 701/416 |
| 2009/0005961 A1* | 1/2009 | Grabowski | .......... | G01C 21/365 701/532 |
| 2011/0313654 A1* | 12/2011 | Olson | ................. | G01C 21/3415 701/516 |
| 2012/0046819 A1* | 2/2012 | Agrawal | ............ | G01C 21/3407 701/25 |
| 2012/0158243 A1* | 6/2012 | Pupin | ................. | B62D 15/0295 701/36 |
| 2012/0179361 A1* | 7/2012 | Mineta | ............... | G01C 21/3469 701/410 |
| 2013/0190944 A1* | 7/2013 | Brandin | ................. | G01C 21/26 701/1 |
| 2014/0266656 A1* | 9/2014 | Ng-Thow-Hing | ..... | G08G 1/166 340/435 |
| 2015/0100179 A1* | 4/2015 | Alaniz | .................... | A63F 13/00 701/1 |
| 2015/0100234 A1* | 4/2015 | Schwab | ............... | G01C 21/365 701/436 |
| 2015/0149088 A1* | 5/2015 | Attard | ..................... | G01C 21/36 701/538 |
| 2015/0319093 A1* | 11/2015 | Stolfus | ................ | H04L 12/6418 370/237 |
| 2015/0345971 A1* | 12/2015 | Meuleau | ............ | G01C 21/3492 701/25 |
| 2016/0009294 A1* | 1/2016 | Gunaratne | ............ | B60W 50/12 701/36 |
| 2016/0052394 A1* | 2/2016 | Yamada | ................. | B60K 37/04 701/93 |
| 2016/0052549 A1* | 2/2016 | Eichhorn | ............... | B60K 35/00 701/41 |
| 2016/0073031 A1* | 3/2016 | Watanabe | ............. | G02F 1/0121 345/7 |
| 2016/0171521 A1* | 6/2016 | Ramirez | ............ | G06Q 30/0224 701/409 |
| 2016/0284125 A1* | 9/2016 | Bostick | ................. | G06T 19/006 |
| 2016/0304126 A1* | 10/2016 | Yamaoka | ............ | B62D 15/0255 |
| 2016/0305787 A1* | 10/2016 | Sato | ...................... | G05D 1/0088 |
| 2017/0030725 A1* | 2/2017 | Gordon | ................. | B60W 30/00 |
| 2017/0066450 A1* | 3/2017 | Ko | ..................... | B60W 50/0098 |
| 2017/0080952 A1* | 3/2017 | Gupta | .................... | B60K 35/00 |
| 2017/0113686 A1* | 4/2017 | Horita | .................. | B60W 30/12 |
| 2017/0185853 A1* | 6/2017 | Yokota | ................. | H04N 5/232 |
| 2017/0220039 A1* | 8/2017 | Funakawa | ........... | B60W 30/182 |
| 2017/0261987 A1* | 9/2017 | Takahashi | ............. | B60W 50/10 |
| 2017/0276494 A1* | 9/2017 | Kusano | ............ | G01C 21/3415 |
| 2017/0277193 A1* | 9/2017 | Frazzoli | ............... | G05D 1/0214 |
| 2017/0334442 A1* | 11/2017 | Sakai | .................... | B60W 30/09 |
| 2017/0361853 A1* | 12/2017 | Nagy | .................... | B60W 50/14 |
| 2018/0105167 A1* | 4/2018 | Kim | ...................... | B60W 30/06 |
| 2018/0105186 A1* | 4/2018 | Motomura | ............ | B60W 50/14 |
| 2018/0118223 A1* | 5/2018 | Mori | ...................... | B60W 40/09 |
| 2018/0203455 A1* | 7/2018 | Cronin | .................. | B60W 50/14 |
| 2018/0299284 A1* | 10/2018 | Wang | ................... | G08G 1/0141 |
| 2018/0309592 A1* | 10/2018 | Stolfus | .................... | H04L 12/43 |
| 2019/0033092 A1* | 1/2019 | Yang | ...................... | G01C 21/34 |

FOREIGN PATENT DOCUMENTS

| | | |
|---|---|---|
| JP | 4297045 B2 | 7/2009 |
| JP | 2010-228740 A | 10/2010 |
| JP | 4847178 B2 | 12/2011 |
| JP | 2013-129328 A | 7/2013 |
| WO | 2015145606 A1 | 10/2015 |
| WO | 2016/042978 A1 | 3/2016 |

OTHER PUBLICATIONS

Office Action issued in corresponding Japanese Patent Application No. 2016-071117, dated Jun. 15, 2017.

* cited by examiner

VEHICLE CONTROL DEVICE AND VEHICLE

CROSS-REFERENCE TO RELATED APPLICATIONS

The present application claims priority from Japanese Patent Application No. 2016-071117 filed on Mar. 31, 2016, the entire contents of which are hereby incorporated by reference.

BACKGROUND

The technology relates to a vehicle control device and a vehicle including the vehicle control device, e.g., an automobile.

Various proposals have been put forward for display devices in vehicles such as automobiles. The display devices may recognize environment forward of an own vehicle with various kinds of environment recognition units, and provide image display of information on, for example but not limited to, a lane shape and an obstacle.

Moreover, advancement of a function of automatic operation and a function of driving assistance has brought practical use of techniques that allow a vehicle to recognize surrounding situation and to set a future traveling line of the own vehicle.

Regarding such automatic setting of the traveling line by the vehicle, proposals have been made to use the display devices as mentioned above, in order to assist a user in supervising validity of setting of a target traveling line. The term "user" refers to, for example but not limited to, an occupant such as a driver in manual operation.

The following is some examples of existing techniques regarding the display device for the vehicle. Japanese Unexamined Patent Application Publication (JP-A) No. 2006-171950 describes that an estimated course of an own vehicle and a recommended course to avoid an obstacle are displayed on a front windshield, with a head up display.

JP-A No. 2007-272350 describes that a target travelable region of an own vehicle is displayed with a head up display, and that a position of the target travelable region is moved in accordance with a change in a vehicle speed.

The following is an example of existing techniques regarding the setting of the traveling line in an automatic operation control. JP-A No. 2005-099930 describes a traveling control system that is intended for improvement in precision of the target traveling line. The traveling control system receives traveling information from a plurality of vehicles through an information center, and performs a steering control on the basis of recommended traveling information on the center side. The recommended traveling information is generated on the basis of a plurality of pieces of traveling information received.

SUMMARY

In the vehicle that performs the automatic operation, the user, or the occupant, may supervise the validity of the setting of the target traveling line displayed on the display device. Sometimes the target traveling line set on the vehicle side may differ from a traveling line assumed by the user, in view of a result of the user's check of a periphery or the user's experience. In such a case, there is concern that the user may have a feeling of distrust of the automatic operation control.

It is therefore desirable to provide a vehicle control device that makes it possible to prevent a user from having a feeling of distrust of automatic operation control, and a vehicle including the display device.

An aspect of the technology provides a vehicle control device mounted on a vehicle that includes an environment recognition unit and an automatic operation control unit. The environment recognition unit is configured to acquire information on surrounding environment around the vehicle, and provide the automatic operation control unit with the information on the surrounding environment. The automatic operation control unit is configured to select one proposed traveling line, as a target traveling line of the vehicle, from a plurality of proposed traveling lines, on a basis of the information on the surrounding environment, and allow the vehicle to travel along the target traveling line. The vehicle control device is configured to provide display of an image of one or more non-selected traveling lines other than the proposed traveling line selected as the target traveling line from the plurality of proposed traveling lines, together with display of an image of the target traveling line.

The vehicle control device may provide display of information on a reason for non-selection of the non-selected traveling line.

The vehicle control device may have a function of selecting one non-selected traveling line as a new target traveling line from the one or more non-selected traveling lines, in accordance with a change in the information on the surrounding environment. The vehicle control device may stop providing the display of the image of any non-selected traveling line of the one or more non-selected traveling lines, upon diminution of possibility that the relevant non-selected traveling line is selected as the new target traveling line.

An aspect of the technology provides a vehicle including an environment recognition unit, an automatic operation control unit, and a vehicle control device. The environment recognition unit is configured to acquire information on surrounding environment around the vehicle, and provide the automatic operation control unit with the information on the surrounding environment. The automatic operation control unit is configured to select one proposed traveling line, as a target traveling line of the vehicle, from a plurality of proposed traveling lines, on a basis of the information on the surrounding environment, and allow the vehicle to travel along the target traveling line. The display device is configured to provide display of an image of one or more non-selected traveling lines other than the proposed traveling line selected as the target traveling line from the plurality of proposed traveling lines, together with display of an image of the target traveling line.

DETAILED DESCRIPTION

A vehicle control device and a vehicle according to one example implementation may provide display of a non-selected traveling line, together with display of a reason for non-selection of the non-selected traveling line. The non-selected traveling line may be a traveling line that has failed in being selected as a target traveling line in automatic operation control. This makes it possible to alleviate a user's feeling of distrust of setting of the target traveling line in the automatic operation control.

In the following, some implementations of the technology are described with reference to the drawings. The following description of the implementations is given on a case with a vehicle control device to which the implementations are applied.

Figure 1:
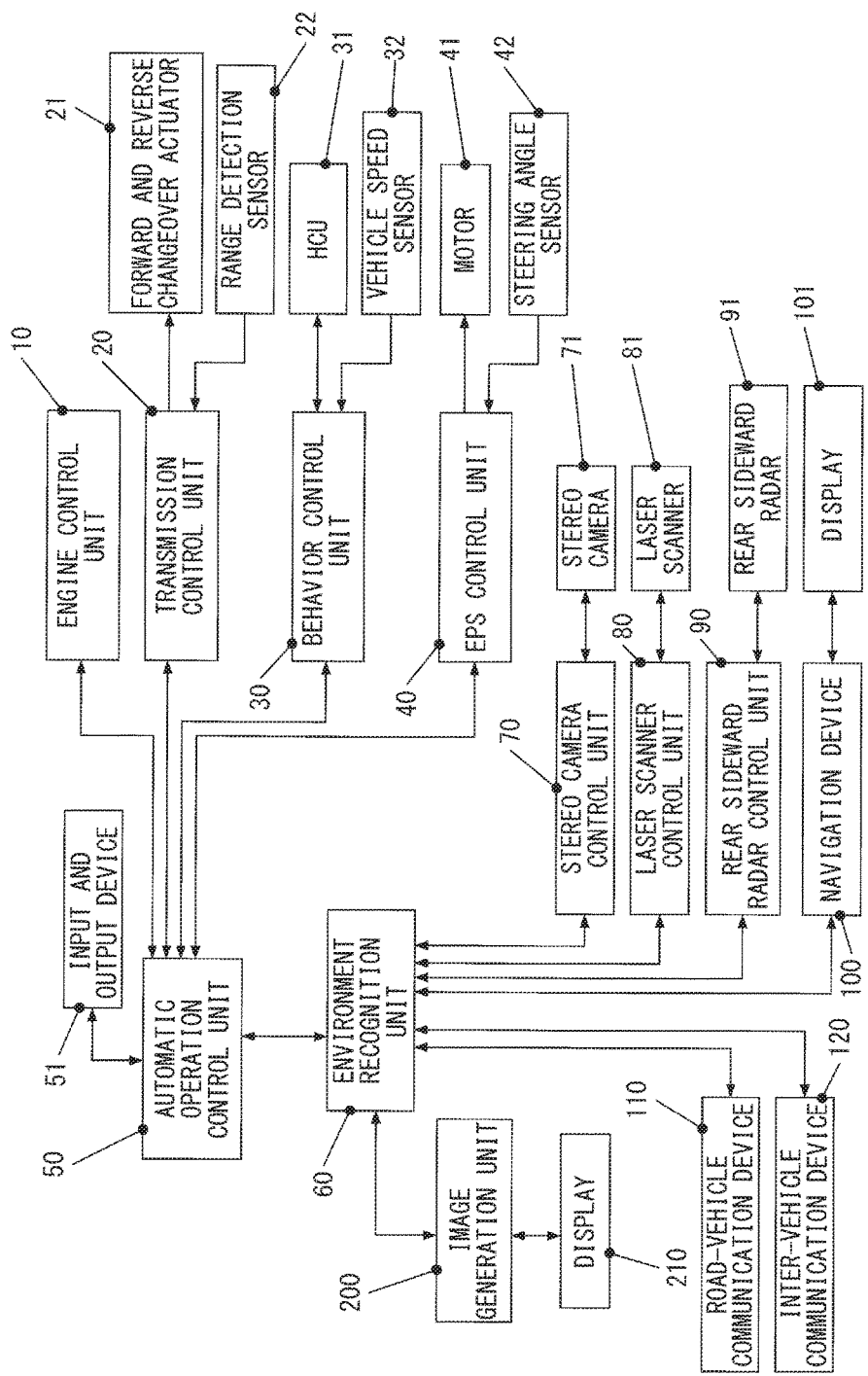
FIG. 1 is a block diagram schematically illustrating a configuration of a vehicle provided with a vehicle control device according to one implementation of the technology.

FIG. 1 is a block diagram schematically illustrating a configuration of a vehicle provided with a vehicle control device according to one implementation of the technology.

The vehicle control device according to the implementation may be mounted on, for example but not limited to, a vehicle 1. The vehicle 1 may be, without limitation, an automobile such as a passenger car, and have a function of automatic operation. The vehicle control device may provide, without limitation, a user with image display of a target traveling line, as well as information on an obstacle around an own vehicle. Non-limiting examples of the user may include a driver in manual operation. Non-limiting examples of the obstacle may include another vehicle.

The user may check a lane shape or the obstacle forward of the own vehicle, on the basis of the information provided by the vehicle control device. In execution of an automatic operation control, the user may supervise validity of the target traveling line set by the automatic operation control, on the basis of the information provided by the vehicle control device.

Referring to FIG. 1, the vehicle 1 may include, for example but not limited to, an engine control unit (ECU) 10, a transmission control unit (TCU) 20, a behavior control unit 30, an electric power steering (EPS) control unit 40, an automatic operation control unit 50, an environment recognition unit 60, a stereo camera control unit 70, a laser scanner control unit 80, a rear sideward radar control unit 90, a navigation device 100, a road-vehicle communication device 110, an inter-vehicle communication device 120, an image generation unit 200, and a display 210.

Each of the units as mentioned above may be a unit including, for example but not limited to, an information processor such as a central processing unit (CPU), a storage unit such as a random access memory (RAM) and a read only memory (ROM), an input and output interface, and a bus that couples them together. The units may communicate with one another through an on-vehicle local area network (LAN) system such as a controller area network (CAN) communication system.

The engine control unit 10 may perform a general control of an engine and its auxiliaries. The engine may serve as a traveling power source of the vehicle 1.

As the engine, for example, a four-stroke gasoline engine may be used.

The engine control unit 10 may control, for example but not limited to, throttle valve opening, fuel injection quantity and injection timing, and ignition timing of the engine, to control output torque of the engine.

In a state in which the vehicle 1 is operated in accordance with driving operation of the driver, the engine control unit 10 may control an output of the engine, to allow actual torque of the engine to approximate to torque requested by the driver. The torque requested by the driver may be set on the basis of, for example but not limited to, an operation amount of an accelerator pedal.

In a case of the automatic operation of the vehicle 1, the engine control unit 10 may control the output of the engine, in accordance with an instruction from the automatic operation control unit 50.

The transmission control unit 20 may perform a general control of an undepicted transmission and its auxiliaries. The transmission may change a rotation output of the engine, and make a forward and reverse changeover of the vehicle.

In the case of the automatic operation of the vehicle 1, the transmission control unit 20 may switch ranges such as forward and reverse movements, and set a gear ratio, in accordance with an instruction from the automatic operation control unit 50.

As the transmission, various automatic transmissions may be used. Non-limiting examples may include a continuously variable transmission (CVT) of a chain type, a belt type, or a toroidal type, a stepped automatic transmission (AT) including a plurality of planetary gear sets, a dual clutch transmission (DCT), and an automated manual transmission (AMT).

The transmission may include, for example but not limited to, a starting device and a forward and reverse changeover mechanism, besides a transmission mechanism such as a variator. Non-limiting examples of the starting device may include a torque converter, a dry clutch, and a wet clutch. The forward and reverse changeover mechanism may make a changeover between a forward traveling range and a reverse traveling range.

A forward and reverse changeover actuator 21 and a range detection sensor 22, without limitation, may be coupled to the transmission control unit 20.

The forward and reverse changeover actuator 21 may drive a forward and reverse changeover valve, to make the forward and reverse changeover of the vehicle. The forward and reverse changeover valve may switch oil paths that supply oil pressure to the forward and reverse changeover mechanism.

The forward and reverse changeover actuator 21 may include, for example but not limited to, an electric actuator such as a solenoid.

The range detection sensor 22 may be a sensor or a switch that determines which range is currently selected in the transmission, the forward or the reverse.

The behavior control unit 30 may perform an individual control of a wheel cylinder hydraulic pressure of a hydraulic service brake, to perform a behavior control and an antilock brake control. The hydraulic service brake may be provided for each of front and rear wheels. The front wheels may be disposed on right and left sides, and so may be the rear wheels. The behavior control may involve restraining vehicle behavior such as understeering or oversteering. The antilock brake control may involve making a recovery from a wheel lock in braking.

A hydraulic control unit (HCU) 31 and a vehicle speed sensor 32, without limitation, may be coupled to the behavior control unit 30.

The hydraulic control unit 31 may include, for example but not limited to, an electric pump and a valve. The electric pump may apply pressure to a brake fluid that serves as a working fluid of the hydraulic service brake. The valve may make an individual adjustment of the hydraulic pressure supplied to the wheel cylinder of each of the wheels.

In the case of the automatic operation of the vehicle 1, the hydraulic control unit 31 may generate braking power to the wheel cylinder of each of the wheels, in accordance with a braking instruction from the automatic operation control unit 50.

The vehicle speed sensor 32 may be provided in a hub of each of the wheels. The vehicle speed sensor 32 may generate a vehicle speed pulse signal having a frequency proportional to a rotation speed of the wheel.

Detecting the frequency of the vehicle speed pulse signal and performing predetermined operation processing on the frequency detected makes it possible to calculate a traveling speed of the vehicle, i.e., a vehicle speed.

The electric power steering control unit 40 may perform a general control of an electric power steering device and its auxiliaries. The electric power steering device may include an electric motor, and provide assistance with steering operation of the driver with use of the electric motor.

A motor 41 and a steering angle sensor 42, without limitation, may be coupled to the electric power steering control unit 40.

The motor 41 may serve as an electric actuator that applies assisting power to a steering system of the vehicle, to provide the assistance with the steering operation of the driver, or changes a steering angle in the automatic operation.

In the case of the automatic operation of the vehicle 1, the motor 41 may impart, in accordance with a steering instruction from the automatic operation control unit 50, torque to the steering system, to allow the steering angle of the steering system to approximate to a predetermined target steering angle. The motor 41 may thereby cause steering to be performed.

The steering angle sensor 42 may detect a current steering angle in the steering system of the vehicle.

The steering angle sensor 42 may include, for example but not limited to, a position encoder that detects an angular position of a steering shaft.

The automatic operation control unit 50 may output a control instruction to, for example but not limited to, the engine control unit 10, the transmission control unit 20, the behavior control unit 30, and the electric power steering control unit 40 as mentioned above, to execute the automatic operation control, in a case in which an automatic operation mode is selected. The automatic operation control may involve allowing the vehicle to travel automatically.

In one implementation of the technology, the automatic operation control unit 50 may serve as an "automatic operation control unit".

The automatic operation control unit 50 may set a target traveling line, upon the selection of the automatic operation mode. The setting of the target traveling line may be provided in accordance with, for example but not limited to, information on situation around the own vehicle and an instruction from the undepicted driver. The information on the situation around the own vehicle may be supplied from the environment recognition unit 60. The target traveling line may be a traveling line along which the own vehicle ought to travel. The automatic operation control unit 50 may automatically perform, for example but not limited to, acceleration or starting of the vehicle, deceleration or stopping of the vehicle, the forward and reverse changeover, and the steering. The automatic operation control unit 50 may thereby execute the automatic operation that allows the vehicle to automatically travel to a pre-set destination.

The automatic operation mode may be stopped, and be able to return to a manual operation mode, in accordance with a predetermined cancel operation from the user. The return to the manual operation mode may be carried out at a desire of the user for manual operation, or alternatively in a case in which continuation of the automatic operation is difficult.

The manual operation mode refers to a mode in which the manual operation by the driver is performed.

An input and output device 51 may be coupled to the automatic operation control unit 50.

The input and output device 51 may output information such as an alarm and various messages to the user from the automatic operation control unit 50. The input and output device 51 may also accept an input of various operations from the user.

The input and output device 51 may include, for example but not limited to, an image display device such as a liquid crystal display (LCD), a sound output device such as a speaker, and an operation input device such as a touch panel.

The environment recognition unit 60 may recognize information on surroundings of the own vehicle, and provide the automatic operation control unit 50 with the information. In one implementation of the technology, the environment recognition unit 60 may serve as an "environment recognition unit".

The environment recognition unit 60 may recognize the obstacle around the own vehicle, and the lane shape of a road on which the own vehicle is traveling, on the basis of information supplied from, for example but not limited to, the stereo camera control unit 70, the laser scanner control unit 80, the rear sideward radar control unit 90, the navigation device 100, the road-vehicle communication device 110, and the inter-vehicle communication device 120. Non-limiting examples of the obstacle may include a stopped vehicle, a traveling vehicle, a building, a geographical feature, a pedestrian, and a cyclist.

The stereo camera control unit 70 may control stereo cameras 71. The stereo cameras 71 may be provided, in a plurality of pairs, around the vehicle. The stereo camera control unit 70 may perform image processing on an image transmitted from the stereo cameras 71.

Each of the stereo cameras 71 may include, without limitation, a pair of camera units arranged side by side. The camera units may each include, without limitation, an imaging optical system such as a lens, a solid-state imaging element such as a complementary metal oxide semiconductor (CMOS) image sensor, a driver circuit, and a signal processing device.

The stereo camera control unit 70 may recognize a shape of an object captured by the stereo cameras 71 and a relative position to the own vehicle of the object, on the basis of a result of the image processing with utilization of a known stereo image processing technique.

In one specific but non-limiting example, the stereo camera control unit 70 may be able to detect lane lines on both sides of the lane forward of the own vehicle, and to recognize the lane shape.

The laser scanner control unit 80 may control the laser scanners 81. The laser scanner control unit 80 may recognize various objects as three-dimensional (3D) point group data, on the basis of an output of the laser scanners 81. Non-limiting examples of the various objects may include another vehicle and the obstacle around the vehicle 1.

The rear sideward radar control unit 90 may control the rear sideward radar 91. The rear sideward radar 91 may be provided on right and left side parts of the vehicle 1. The rear sideward radar control unit 90 may detect an object that exists rear sideward of the own vehicle, on the basis of an output of the rear sideward radar 91.

The rear sideward radar 91 may detect, for example, another vehicle that approaches from rear sideward of the vehicle 1.

As the rear sideward radar 91, radar such as laser radar and millimeter-wave radar may be used.

Figure 2:
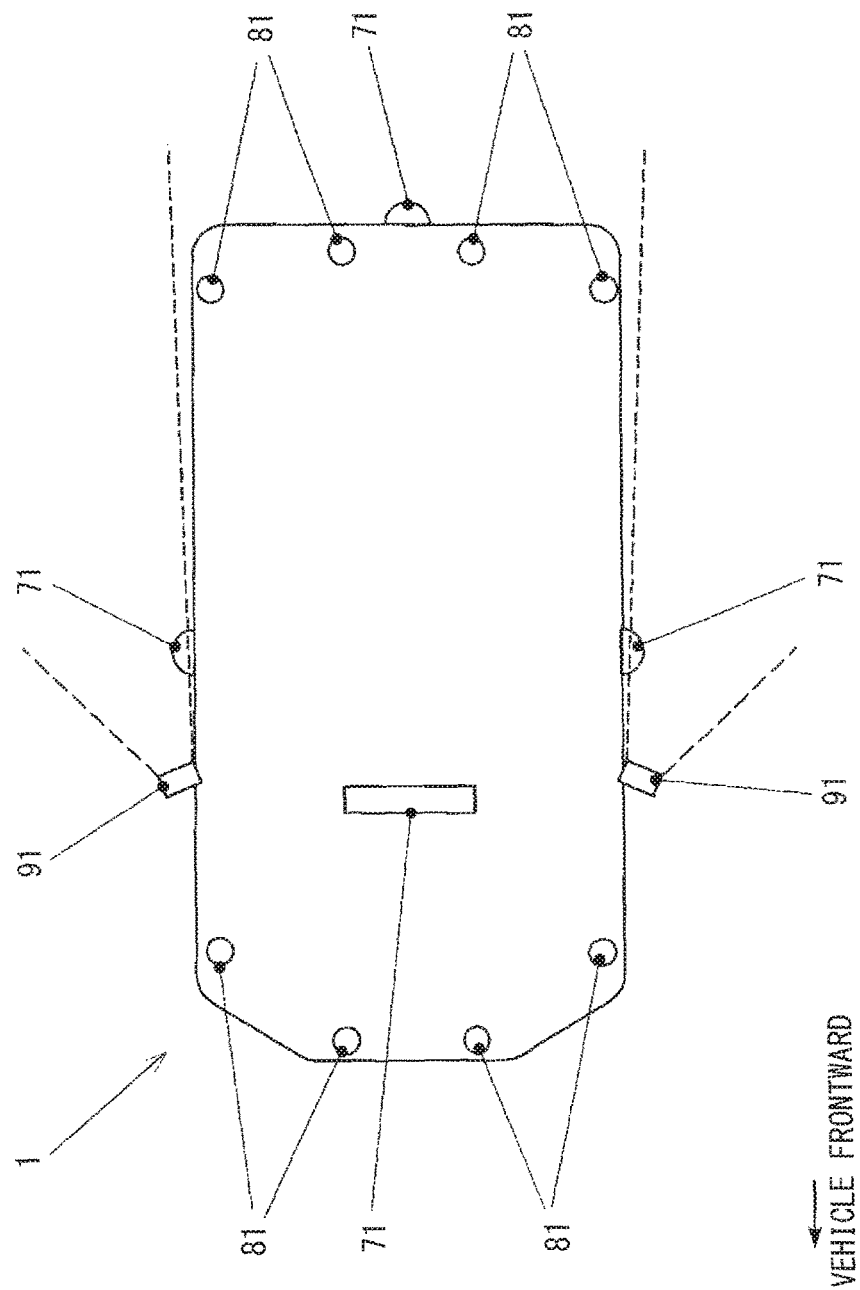
FIG. 2 schematically illustrates disposition of sensors that recognize a periphery of the vehicle, in the vehicle according to the implementation.

FIG. 2 provides schematic illustration of disposition of the sensors that recognize the surroundings of the vehicle 1, in the vehicle 1 according to this implementation.

The stereo cameras 71 may be disposed in a front part, a rear part, and the right and left side parts of the vehicle 1.

The laser scanners 81 may be provided in a plurality, and in a distribution pattern that substantially prevents a dead angle around the vehicle 1.

The rear sideward radar 91 may be disposed on, for example but not limited to, the right and left side parts of a vehicle body of the vehicle 1, with its detection range directed rearward of the vehicle and outward in a width direction of the vehicle.

The navigation device 100 may include, for example but not limited to, an own-vehicle positioning unit such as a global positioning system (GPS) receiver, a data accumulation unit, and a gyro sensor. The data accumulation unit may accumulate map data prepared in advance. The gyro sensor may detect an azimuth of a front and rear direction of the vehicle 1.

The map data may include road information for each lane. Non-limiting examples of the road information may include a road, an intersection, and an interchange.

The road information may include not only a three-dimensional data of the lane shape but also information on traveling restriction such as permission or non-permission to make a right turn or a left turn, a temporary stop position, and a speed limit of each lane.

The navigation device 100 may include a display 101. The display 101 may be incorporated in an instrumental panel.

The display 101 may be an image display device that displays various pieces of information outputted to the driver by the navigation device 100.

The display 101 may include a touch panel, and serve as an input unit on which various operation inputs from the driver may be made.

The road-vehicle communication device 110 may communicate with an undepicted around station by a communication system in conformity with a. predetermined standard. The road-vehicle communication device 110 may thereby acquire information regarding, for example but not limited to, traffic congestion, lighting states of traffic signals, road construction, a scene of a traffic accident, lane regulation, weather, and road surface conditions.

The inter-vehicle communication device 120 may communicate with another vehicle undepicted, by a communication system in conformity with a predetermined standard. The inter-vehicle communication device 120 may thereby acquire information on a vehicle state of another vehicle and information on a vehicle attribute of another vehicle. Non-limiting examples of the information on the vehicle state of another vehicle may include a position, an azimuth angle, acceleration, and a speed of another vehicle. Non-limiting examples of the information on the vehicle attribute of another vehicle may include a vehicle model and a vehicle size of another vehicle.

The image generation unit 200 may generate an environment image, on the basis of a result of environment recognition transmitted from the environment recognition unit 60. The environment image may be an image that includes information regarding the environment around the own vehicle. The environment image may be displayed on the display 210.

In one implementation of the technology, a combination including the image generation unit 200 and the display 210 may serve as a "vehicle control device".

The display 210 may be an image display device disposed in confronted relation to the occupant of the vehicle 1.

The display 210 may include, for example, a liquid crystal display (LCD) incorporated in an interior member such as the instrumental panel.

Description is given next of image display operation of the vehicle control device according to this implementation, and one example of image display.

Figure 3:
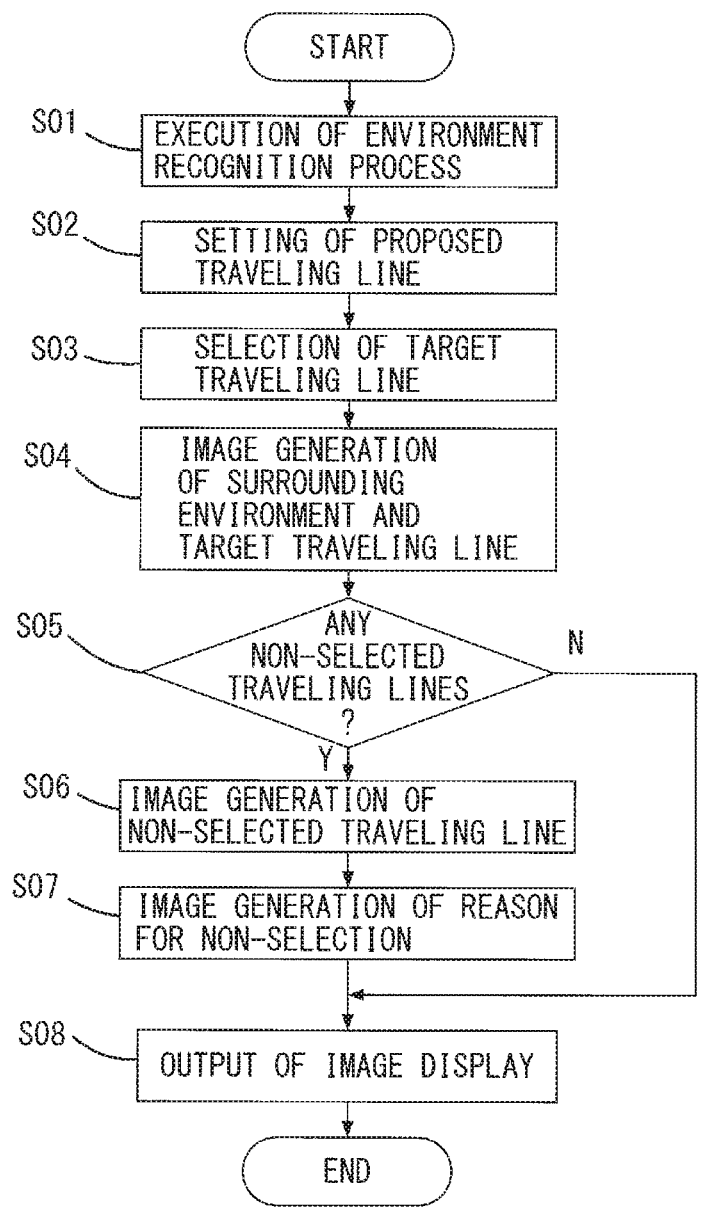
FIG. 3 is a flowchart illustrating operation of the vehicle control device according to the implementation.

FIG. 3 is a flowchart of the operation of the vehicle control device according to this implementation. In the following, description of each step is given in the order of a sequence of steps.

[Step S01: Execution of Environment Recognition Process]

The environment recognition unit 60 may perform the environment recognition of the surroundings of the vehicle 1, to acquire information such as the lane shape, and a relative speed and a relative distance to the own vehicle 1 of the obstacle such as another vehicle.

Thereafter, the flow may proceed to step S02.

[Step S02: Setting of Proposed Traveling Line]

The automatic operation control unit 50 may set a proposed traveling line, on the result of the environment recognition in step S01. The proposed traveling line may be a traveling line that allows the vehicle 1 to travel without coming into contact with the obstacle such as another vehicle, or without coming close to another vehicle with the relative distance of a predetermined value or smaller.

The proposed traveling line may be set in a plurality, depending on the environment around the vehicle 1.

The proposed traveling line may include one that involves traveling while maintaining a lateral position within the lane in the traveling lane of the vehicle 1. Besides, the proposed traveling line may include one that involves making a lane change, one that involves a junction or a branch, one that involves making, without limitation, the right turn or the left turn at the intersection, and one that involves shifting the lateral position within the lane in the traveling lane of the vehicle 1, in order to avoid passing of a large-sized vehicle traveling on an adjacent lane or to avoid the obstacle.

Thereafter, the flow may proceed to step S03.

[Step S03: Selection of Target Traveling Line]

When the proposed traveling line set in step S02 is in a singularity, the automatic operation control unit 50 may set the relevant proposed traveling line as the target traveling line, and execute the automatic operation control.

When the proposed traveling line set in step S02 is in the plurality, the automatic operation control unit 50 may determine relative merits of the plurality of proposed traveling lines, on the basis of estimation of potential for, without limitation, contact with another vehicle or the obstacle, and/or factors such as involvement or non-involvement of sudden acceleration, sudden braking, or sudden steering.

The automatic operation control unit 50 may set, as the target traveling line, the proposed traveling line determined as being an optimum, and execute the automatic operation control.

Thereafter, the flow may proceed to step S04.

[Step S04: Image Generation of Surrounding Environment and Target Traveling Line]

The image generation unit 200 may acquire, from the environment recognition unit 60, the information on the environment around the own vehicle. The image generation unit 200 may also acquire, from the automatic operation control unit 50, the information on the target traveling line selected in step S03.

The image generation unit 200 may generate, on the basis of the information acquired, an image of, for example but not limited to, a road shape, the lane shape, and distribution of other vehicles around the vehicle 1. The image generation unit 200 may also superimpose the image of the target traveling line on the image generated.

Thereafter, the flow may proceed to step S05.

[Step S05: Determination on Presence or Absence of Non-selected Traveling Line]

The image generation unit 200 may determine presence or absence of a non-selected traveling line, i.e., a proposed but non-selected traveling line, on the basis of information supplied from the automatic operation control unit 50.

In a case of the presence of the non-selected traveling line (Y in step S05), the flow may proceed to step S06. Otherwise (N in step S05), the flow may proceed to step S08.

[Step S06: Image Generation of Non-selected Traveling Line]

The image generation unit 200 may generate an image of the non-selected traveling line, and superimpose the image of the non-selected traveling line on the image generated in step S04 of the surrounding environment and the target traveling line.

Here, the image of the non-selected traveling line may have different setting of display modes from that of the image of the target traveling line. Non-limiting examples of the display modes may include a color, luminance, transparency, and a shape.

Thereafter, the flow may proceed to step S07.

[Step S07: Image Generation of Reason for Non-selection]

The image generation unit 200 may generate, in the vicinity of the image of the non-selected traveling line, display of a reason for the non-selection of the non-selected traveling line.

The display may be provided, for example, solely in pattern display such as an icon, or alternatively, the display may be provided solely in character display. In another alternative, the display may include both the pattern display and the character display.

Thereafter, the may proceed to step S08.

[Step S08: Output of Image Display]

The image generation unit 200 may output the image generated in the series of processing, and allow the display 210 to display the image and to provide the user with the image.

Thereafter, the series of processing may be ended.

Figure 4:
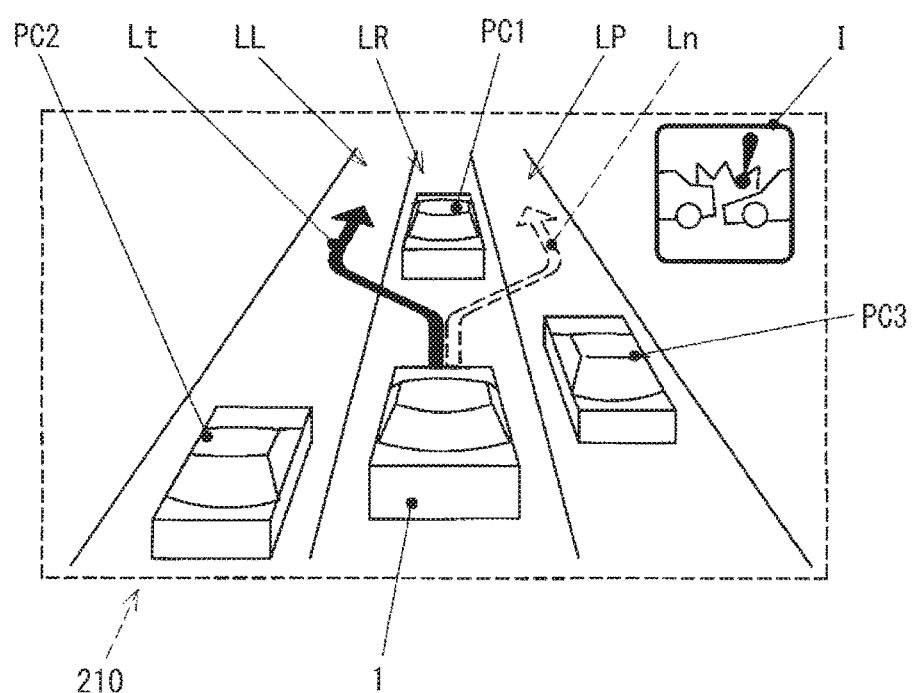
FIG. 4 illustrates one example of display provided by the vehicle control device according to the implementation.

FIG. 4 illustrates one example of the image display provided on the vehicle control device according to this implementation.

In one specific but non-limiting example, FIG. 4 illustrates a state of traveling on a highway for left-side traffic that includes three lanes on each side. The term "highway" refers to a high-grade expressway.

The image display may include the lane shape, or a lane line shape, recognized by the environment recognition unit 60.

In FIG. 4, depicted are a left traveling lane LL, a right traveling lane LR, and a passing lane LP, in the order named from the left.

The lanes may be divided by the lane lines that extend along lane edges.

In the example illustrated in FIG. 4, the vehicle 1 may be traveling on the right traveling LR disposed in the middle of the three lanes.

A passenger car PC1 may be traveling forward of the vehicle 1, on the right traveling lane LR.

A passenger car PC2 may be traveling sideward of the vehicle 1, on the left traveling lane LL.

A passenger car PC3 may be traveling obliquely forward of the vehicle 1, on the passing lane LP.

In FIG. 4, displayed are the target traveling line Lt and a non-selected traveling line Ln.

The target traveling line IA may be set so as to allow the vehicle 1 to make the lane change from the right traveling lane LR to the left traveling lane LL, to make entry forward of the passenger car PC2, and thereafter, to pass the passenger car PC1.

The automatic operation control unit 50 may perform the automatic operation control so as to allow an actual traveling locus of the vehicle 1 to approximate to the target traveling line Lt.

Meanwhile, the non-selected traveling line Ln may be set so as to allow the vehicle 1 to make the lane change from the right traveling lane LR to the passing lane LP, to make the entry forward of the passenger car PC3, and thereafter, to pass the passenger car PC1.

However, if the non-selected traveling line Ln were selected, an inter-vehicle distance between the own vehicle 1 and the subsequent passenger car PC3 would be smaller than a predetermined allowable limit immediately after the lane change. This would cause possibility of being collided from behind. This is a reason why the automatic operation control unit 50 has decided the non-selection of the non-selected traveling line Ln in step S03.

The target traveling line Lt and the non-selected traveling line Ln may be displayed with, for example but not limited to, respective arrow-pointed lines, as illustrated in FIG. 4.

Note that the target traveling line Lt and the non-selected traveling line Ln may both be set straightforward halfway on the right traveling line LR, but the target traveling line Lt and the display of the non-selected traveling line Ln may be displayed in parallel relation for an easier understanding, instead of in overlapped relation.

Moreover, in a preferable but non-limiting example, in a case of the parallel display, an order of the display in the vehicle width direction may be set so as to avoid an intersection of the display of the target traveling line Lt and the display of the non-selected traveling line Ln.

For example, in the example illustrated in FIG. 4, the display of the parallel-disposed part may be provided, with the target traveling line Lt disposed on the left side of the non-selected traveling line Ln.

There may be further provided an indication I adjacently to the non-selected traveling line Ln. The indication I may indicate a reason of the non-selection. In the example illustrated in FIG. 4, the indication I may indicate the possibility of being collided because of the small inter-vehicle distance between the vehicle 1 and the subsequent passenger car PC3 on the lane to which the vehicle 1 has made the lane change.

The indication I may be provided, for example, solely in the pattern display, or an icon as illustrated in FIG. 4, or alternatively, the indication I may be provided solely in the character display. In another alternative, the indication I may include both the pattern display and the character display.

Note that in some cases, a subsequent change in the environment around the vehicle 1 may cause re-setting of the non-selected traveling line Ln as the new target traveling line Lt. Non-limiting examples of such a change may include deceleration of the passenger car PC3, and the lane change of the passenger car PC3 to make the entry behind the vehicle 1.

In this case, on the display screen as well, the display of the target traveling line Lt and the display of the non-selected traveling line Ln may be switched.

In one alternative case, a different change in the environment from the case as mentioned above may cause an appreciable diminution or elimination of possibility of the re-setting of the non-selected traveling line Ln as the target traveling line Lt in the future. In other words, there may be a case in which the non-selected traveling line Ln has little or no possibility of being traveled. In this case, the display of the non-selected traveling line Ln may be non-displayed, or stopped.

Effects of this implementation as described above may be as follows.

(A) The display of the non-selected traveling line Ln, i.e., the proposed but non-selected traveling line may be provided, together with the display of the target traveling line Lt. Hence, it is possible to alleviate or eliminate the user's feeling of distrust of the setting of the target traveling line provided by the automatic operation control. This is because it becomes clear that the current target traveling line has been selected from the proposed traveling lines including the traveling line assumed by the user, on a condition that the traveling line assumed by the user coincides with the non-selected traveling line, even if the traveling line assumed by the user is different from the target traveling line Lt set on the vehicle side.

(B) The reason for the non-selection of the non-selected traveling line Ln may be provided with the icon or the characters. Hence, it is possible to give the user an easier understanding of the validity of the setting of the target traveling line Lt.

(C) The display of the non-selected traveling line Ln having little or no possibility of being actually traveled may be non-displayed. This makes it possible to allow the user to recognize that the non-selected traveling line Ln has little or no possibility of the re-setting as the new target traveling line in accordance with the change in the environment around the own vehicle. Hence, it is possible to give the user an understanding of a scenario of the automatic operation control generated on the vehicle side.

[Modifications]

The technology is by no means limited to the implementations described above. It should be appreciated that modifications and alterations may be made, and the technology is intended to include such modifications and alterations. (A) The configurations of the vehicle control device or the configurations of the vehicle are not limited to the implementations described above, but may be modified or altered as appropriate. In the forgoing implementations, the vehicle may be a passenger car, but the technology may be also applicable to a commercial vehicle such as a cargo vehicle, a truck, a bus, a motorcycle, and other various special vehicles.

(B) In the forgoing implementations, the vehicle may utilize the engine as the traveling power source. However, the technology is not limited thereto. The vehicle may utilize, as the traveling power source, an electric motor or a hybrid system as a combination of the engine and the electric motor.

(C) The kinds or the disposition of the sensors that perform the environment recognition around the own vehicle are not limited to as exemplified in the forgoing implementations, but may be modified or altered as appropriate. For example, various sensors may be utilized together with, or may be replaced with, the sensors as exemplified in the forgoing implementations. Non-limiting examples of the sensors may include the millimeter-wave radar, the laser radar, a monocular camera, and ultrasonic sonar.

(D) In the forgoing implementations, the example of the image display may be provided in an overhead view or a bird's eye view, but this is non-limiting. In one alternative example, the image display may be provided in a plan view, or in a driver's view as viewed from a viewpoint of a virtual driver. In another alternative, a 3D display may be provided with use of a display that is able to provide 3D display. Moreover, in the forgoing implementations, the image display may be provided on the display incorporated in the instrumental panel, but this is non-limiting. In one alternative example, the image display may be provided with a head up display that projects an image on a windscreen.

(E) The techniques of the selection of the target traveling line from the plurality of proposed traveling lines are not limited to the configurations of the forgoing implementations, but may be modified or altered as appropriate.

In one implementation described above, the image generation unit 200 illustrated in FIG. 1 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the image generation unit 200. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control device configured to be mounted on a vehicle, the vehicle control device comprising:
    an environment recognition unit being configured to acquire information on surrounding environment around the vehicle;
    an automatic operation control unit being configured to select one proposed traveling line, as a target traveling line of the vehicle, from a plurality of proposed traveling lines, on a basis of the information on the surrounding environment, and control the vehicle to travel along the target traveling line; and an image generation unit being configured to generate a first image including an image of the surrounding environment around the vehicle based on the acquired information on the surrounding environment, and an image of the target traveling line along which the vehicle is currently traveling under the control of the automatic operation control unit, wherein the image generation unit is further configured to, after the automatic operation control unit selects the target traveling line from the plurality of proposed traveling lines:
  determine whether there are one or more non-selected traveling lines of the plurality of proposed traveling lines, other than the target traveling line;
  when there are the one or more non-selected traveling lines, obtain the one or more non-selected traveling lines of the plurality of proposed traveling lines;
  generate a second image including an image of the one or more non-selected traveling lines and an image indicating a reason why the one or more non-selected traveling lines are not selected; and
  include the second image into the first image.

2. The vehicle control device according to claim 1, wherein the image generation unit stops including into the first image an image of one non-selected traveling line of the one or more non-selected traveling lines, upon diminution of possibility that the one non-selected traveling line is selected as a new target traveling line.

3. The vehicle control device according to claim 1, wherein the automatic operation control unit has a function of selecting one non-selected traveling line as a new target traveling line from the one or more non-selected traveling lines, in accordance with a change in the information on the surrounding environment.

4. A vehicle comprising:

an environment recognition unit being configured to acquire information on surrounding environment around the vehicle, an automatic operation control unit being configured to select one proposed traveling line, as a target traveling line of the vehicle, from a plurality of proposed traveling lines, on a basis of the information on the surrounding environment, and control the vehicle to travel along the target traveling line; and an image generation unit being configured to generate a first image including an image of the surrounding environment around the vehicle based on the acquired information on the surrounding environment, and an image of the target traveling line along which the vehicle is currently traveling under the control of the automatic operation control unit, wherein the image generation unit is further configured to, after the automatic operation control unit selects the target traveling line from the plurality of proposed traveling lines:
  determine whether there are one or more non-selected traveling lines of the plurality of proposed traveling lines, other than the target traveling line;
  when there are the one or more non-selected traveling lines, obtain the one or more non-selected traveling lines of the plurality of proposed traveling lines;
  generate a second image including an image of the one or more non-selected traveling lines and an image indicating a reason why the one or more non-selected traveling lines are not selected; and
  include the second image into the first image.

* * * * *